United States Patent
Guo et al.

(10) Patent No.: US 11,630,381 B2
(45) Date of Patent: Apr. 18, 2023

(54) EXCITATION LIGHT INTENSITY CONTROL SYSTEM AND METHOD, AND PROJECTION SYSTEM

(71) Applicant: APPOTRONICS CORPORATION LIMITED, Guangdong (CN)

(72) Inventors: Zuqiang Guo, Shenzhen (CN); Fei Hu, Shenzhen (CN); Yi Li, Shenzhen (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 509 days.

(21) Appl. No.: 16/612,725

(22) PCT Filed: Jul. 28, 2017

(86) PCT No.: PCT/CN2017/094802
§ 371 (c)(1),
(2) Date: Jun. 17, 2020

(87) PCT Pub. No.: WO2018/205420
PCT Pub. Date: Nov. 15, 2018

(65) Prior Publication Data
US 2020/0310235 A1    Oct. 1, 2020

(30) Foreign Application Priority Data

May 17, 2017  (CN) .......................... 201710349596.X

(51) Int. Cl.
*H04N 9/31*       (2006.01)
*G03B 21/20*     (2006.01)
(Continued)

(52) U.S. Cl.
CPC ......... *G03B 21/204* (2013.01); *G02B 27/141* (2013.01); *G02B 27/283* (2013.01);
(Continued)

(58) Field of Classification Search
CPC ........... H04N 21/482; H04N 21/42204; H04N 21/42206; H04N 21/637; H04N 21/6377;
(Continued)

(56) References Cited

U.S. PATENT DOCUMENTS 5,055,737 A    10/1991  Murata et al.
7,934,837 B2 *  5/2011  Inoue ................... H04N 9/3158
                                                                349/8
(Continued)

FOREIGN PATENT DOCUMENTS

CN       1667494 A    9/2005
CN    101702072 A    5/2010
(Continued)

OTHER PUBLICATIONS

Chinese Office Action issued in application No. 201710349596.X dated Jun. 8, 2020.
(Continued)

*Primary Examiner* — John W Miller
*Assistant Examiner* — Humam M Satti
(74) *Attorney, Agent, or Firm* — Knobbe, Martens, Olson & Bear LLP

(57) ABSTRACT

An excitation light intensity control system, including a lighting part, an imaging part and a control part. The lighting part includes a light source; the imaging part includes a light modulator and a color conversion element; the excitation light emitted from the light source is imported to the light modulator for modulation; the modulated excitation light excites the color conversion element to produce multicolor excited light; the lighting part further includes a light recycling system used for recoupling part of the excitation light emitted from the light modulator to be incident to the light modulator; the control part includes a controller used for receiving original image data and controlling the inten-
(Continued)

sity of the excitation light emitted from the light modulator and/or the light source.

19 Claims, 6 Drawing Sheets

(51) Int. Cl.
    *G02B 27/14*     (2006.01)
    *G02B 27/28*     (2006.01)
    *G03B 21/00*     (2006.01)

(52) U.S. Cl.
    CPC ....... *G03B 21/006* (2013.01); *G03B 21/2053* (2013.01); *G03B 21/2073* (2013.01); *H04N 9/3182* (2013.01)

(58) Field of Classification Search
    CPC . H04N 21/658–6587; H04N 21/43072; H04N 21/4622; H04N 9/3182; H04N 9/3108; H04N 9/3152; H04N 9/3155; H04N 9/3161; H04N 9/3167; G03B 21/204; G03B 21/006; G03B 21/2053; G03B 21/2073; G03B 21/2013; G03B 21/2066; G02B 27/141; G02B 27/283; G02B 27/0961

See application file for complete search history.

(56) References Cited

U.S. PATENT DOCUMENTS

| | | | | |
|---|---|---|---|---|
| 2005/0179978 | A1* | 8/2005 | Lee | H04N 9/315 |
| | | | | 348/E5.143 |
| 2007/0228927 | A1 | 10/2007 | Kindler et al. | |
| 2008/0084544 | A1* | 4/2008 | Hall | H04N 9/3164 |
| | | | | 353/31 |
| 2008/0246706 | A1* | 10/2008 | Russell | G09G 3/346 |
| | | | | 345/84 |
| 2009/0185144 | A1* | 7/2009 | Grasser | G02B 13/10 |
| | | | | 359/291 |
| 2010/0214282 | A1* | 8/2010 | Whitehead | G09G 3/3406 |
| | | | | 345/214 |
| 2010/0283977 | A1* | 11/2010 | Wang | G03B 21/206 |
| | | | | 250/504 R |
| 2012/0154681 | A1* | 6/2012 | Morimoto | G03B 21/14 |
| | | | | 348/E9.053 |
| 2014/0078271 | A1* | 3/2014 | Oda | H04N 13/341 |
| | | | | 348/56 |
| 2015/0276609 | A1 | 10/2015 | Inoue et al. | |
| 2017/0343477 | A1* | 11/2017 | Santori | G01J 3/0224 |
| 2017/0353702 | A1* | 12/2017 | Wang | H04N 9/3111 |
| 2019/0132499 | A1* | 5/2019 | Yasui | G03B 21/2013 |
| 2020/0110329 | A1* | 4/2020 | Hu | G03B 21/2013 |

FOREIGN PATENT DOCUMENTS

| | | |
|---|---|---|
| CN | 201616861 U | 10/2010 |
| CN | 102279507 A | 12/2011 |
| CN | 102478754 A | 5/2012 |
| CN | 103792767 A | 5/2014 |
| CN | 103792768 A | 5/2014 |
| CN | 103838068 A | 6/2014 |
| CN | 104560038 A | 4/2015 |
| CN | 204994014 U | 1/2016 |
| CN | 105573033 A | 5/2016 |
| CN | 105785700 A | 7/2016 |
| CN | 105911807 A | 8/2016 |
| CN | 105991980 A | 10/2016 |
| CN | 106162116 A | 11/2016 |
| CN | 106169282 A | 11/2016 |
| CN | 205721048 U | 11/2016 |
| CN | 106353956 A | 1/2017 |
| CN | 106356390 A | 1/2017 |
| CN | 106444242 A | 2/2017 |
| CN | 206863464 U | 1/2018 |
| JP | H01-101192 A | 4/1989 |
| JP | 2008-299258 A | 12/2008 |
| JP | 2011-048044 A | 3/2011 |
| JP | 2012-093454 A | 5/2012 |
| WO | WO 2011/092843 A1 | 8/2011 |

OTHER PUBLICATIONS

Chinese Search Report issued in application No. 201710349596.X dated May 31, 2020.
International Search Report of corresponding PCT Application No. PCT/CN2017/094802—6 pages (Sep. 26, 2017).

* cited by examiner

EXCITATION LIGHT INTENSITY CONTROL SYSTEM AND METHOD, AND PROJECTION SYSTEM

CROSS REFERENCE TO RELATED APPLICATIONS

This is a U.S. National Stage Application, filed under 35 U.S.C. 371, of International Patent Application No. PCT/CN2017/094802, filed on Jul. 28, 2017, which claims priority to Chinese patent application No. 201710349596.X filed on May 12, 2017, contents of both of which are incorporated herein by reference in their entireties.

TECHNICAL FIELD

The present disclosure relates to the field of projection display, and more particularly, to an excitation light intensity control system, an excitation light intensity control method, and a projection system adopting the excitation light intensity control system.

BACKGROUND

In the current display field, a DMD or an LCD is mainly used as a light modulator, to modulate illumination light to obtain image light. However, current display devices using the DMD or the LCD as the light modulator generally have a problem of low efficiency.

Specifically, in a display device that uses multicolor light as a light source, the multicolor light being generate by exciting a fluorescent material by laser light, light emitted by a laser emitting element reaches, via optical elements such as a light combining component, a beam shaping component and so on, the fluorescent material with an efficiency being about 90%, and after being converted by the fluorescent material, the illumination light is obtained. It is then coupled to an optical engine system (such as a 3DMD optical engine system, or a 3LCD optical engine system) with an efficiency being about 94%, and it is modulated into image light by the optical engine system with an efficiency being about 30% to 40%. Then, it is projected onto a screen through a projection lens. Therefore, it can be seen that the optical engine system is in a low efficiency, resulting in a low efficiency of the corresponding display device.

SUMMARY

In view of the above circumstances, the present disclosure provides an excitation light intensity control system and a projection system that have a high utilization efficiency of light energy.

In one aspect, the present disclosure provides an excitation light intensity control system including an illumination part, an imaging part and a control part. The illumination part includes a light source, and the imaging part includes a light modulator. Excitation light emitted by the light source is guided into the light modulator for modulation. The imaging part further includes a color conversion element, and the excitation light modulated by the light modulator excites the color conversion element to generate multicolor excited light. The illumination part further includes a light recycling system. The light recycling system is configured to recouple one of two portions of the excitation light emitted by the light modulator to the light modulator, and to guide the other one of the two portions of excitation light to enter the color conversion element. The control part is configured to receive original image data and control intensity of the excitation light emitted by the light modulator and/or intensity of the excitation light emitted by the light source.

In another aspect, the present disclosure provides an excitation light intensity control method, the method being applicable to an excitation light intensity control system. The excitation light intensity control system includes a light source, a light modulator, a color conversion element and a controller. The method includes: calculating, by the controller, a signal value of the light modulator based on an image signal value of one frame of image and a response curve parameter of a specific fluorescent material coated on the color conversion element; calculating, by the controller, intensity of excitation light required to be emitted by the light source based on a ratio of the calculated signal value of the light modulator to a maximum signal value of the light modulator; transmitting, by the controller, a signal to the light source to control the light source to emit the excitation light with the calculated intensity; and transmitting, by the controller, a signal to the light modulator to control intensity of the excitation light emitted by the light modulator.

In still another aspect, the present disclosure provides a projection system including an excitation light intensity control system and a projection lens. The excitation light intensity control system includes an illumination part comprising a light source, an imaging part comprising a light modulator, and control part. Excitation light emitted by the light source is guided into the light modulator for modulation. The imaging part further comprises a color conversion element, and the excitation light modulated by the light modulator excites the color conversion element to generate multicolor excited light. The illumination part further includes a light recycling system configured to recouple one of two portions of excitation light emitted by the light modulator to the light modulator, and to guide the other of the two portions of excitation light to enter the color conversion element. The control part is configured to receive original image data and control intensity of the excitation light emitted by the light modulator and/or intensity of the excitation light emitted by the light source. Excited light emitted by the excitation light intensity control system is projected onto a screen through the projection lens, to render a color image.

Advantages of the excitation light intensity control system and the projection system provided by the embodiments of the present disclosure are as follows. By providing the light recycling system to recycle and reuse the excitation light, a recycling and utilization efficiency of the excitation light is improved. On the other hand, based on the recycling and reuse of the excitation light, the embodiment of the present disclosure also correspondingly controls the intensity of the excitation light emitted by the light modulator and/or the intensity of the excitation emitted by light source in a specific manner, such that it is ensured that image projected onto the screen will not be distorted, and due to reduction of the intensity of the light source, energy consumption is reduced, which improves the utilization efficiency of the light energy.

BRIEF DESCRIPTION OF DORIGINALINGS

DESCRIPTION OF EMBODIMENTS

Hereinafter, technical solutions in the embodiments of the present disclosure will be clearly and completely described with reference to the drawings in the embodiments of the present disclosure. It is apparent that the described embodiments are only part of the embodiments of the present disclosure but not all of the embodiments. All other embodiments obtained by those skilled in the art based on the embodiments of the present disclosure without creative efforts are within the scope of the present disclosure.

All technical and scientific terms used herein have the same meaning as commonly understood by one of ordinary skill in the art to which this present disclosure belongs, unless otherwise defined. The term "or/and" used in the present disclosure includes any and all combinations of one or more of the associated listed items.

Figure 1:
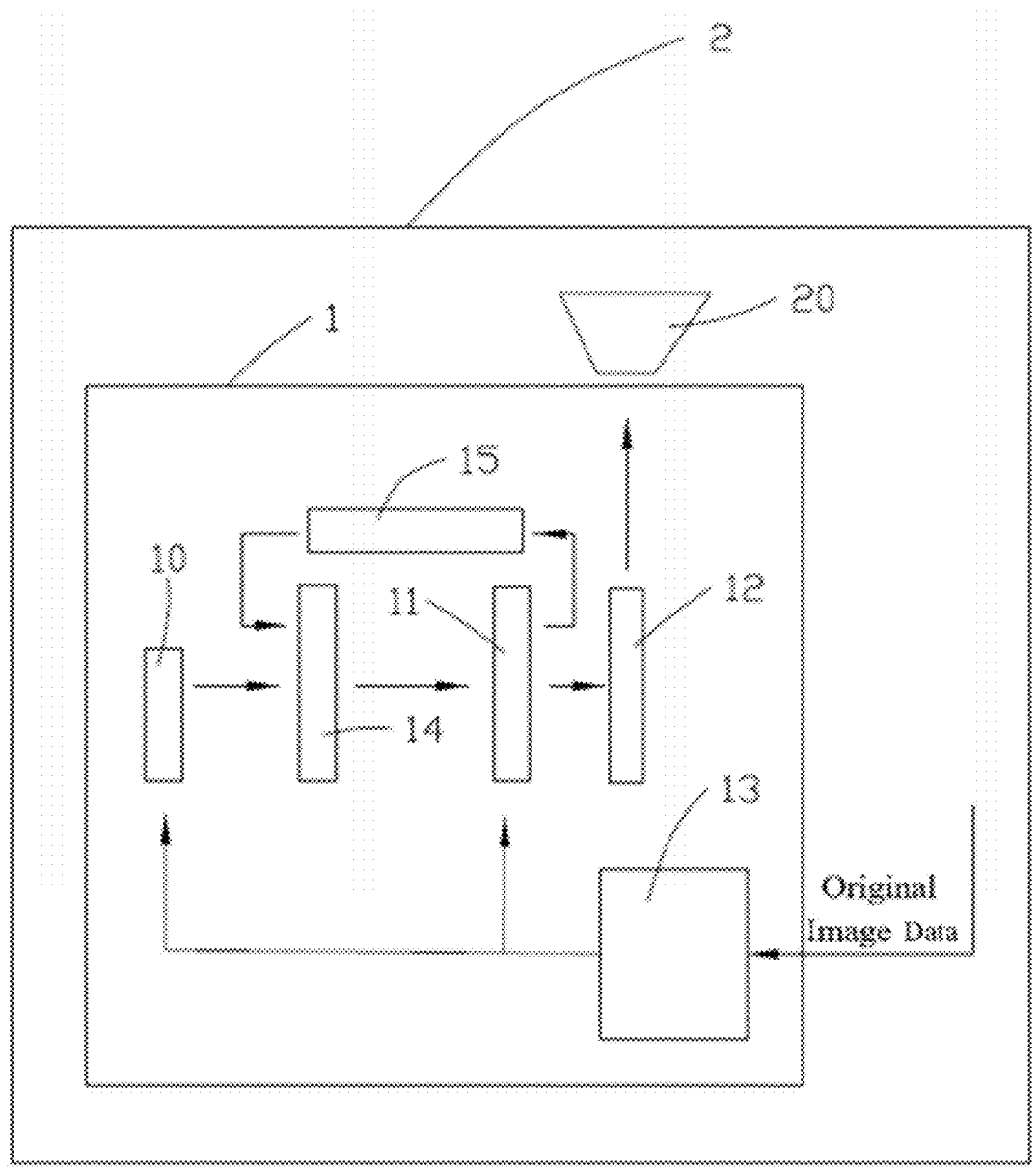
FIG. 1 is a system block diagram of an excitation light intensity control system according to a first embodiment of the present disclosure.

Referring to FIG. 1, it is a block schematic diagram of an excitation light intensity control system 1 in an embodiment of the present disclosure. The excitation light intensity control system 1 can be applied to a projection system 2. The excitation light intensity control system 1 includes an illumination part, an imaging part, and a control part. Specifically, in the present embodiment, the illumination part includes a light source 10, the imaging part includes a light modulator 11 and a color conversion element 12, and the control part includes a controller 13. The controller 13 receives original image data to be displayed and adjusts excitation light intensity at the light source 10 and/or at the light modulator 11 according to the original image data. In the present embodiment, under control of the controller 13, the light source 10 emits excitation light having certain intensity for each frame of image. The light modulator 11 further adjusts intensity of excitation light for each pixel (or sub-pixel), and the adjusted excitation light enters the color conversion element 12, to excite the color conversion element 12 to generate multicolor excited light, such as R (red), G (green), and B (blue) excited light, to form a frame of color image. In the present embodiment, the excitation light intensity control system is applied to the projection system, and the color image generated by the color conversion element 12 is finally projected to a screen (not shown) via a projection lens 20 of the projection system 2. In the present embodiment, the excitation light intensity control system 1 further includes a relay system 14 disposed between the light source 10 and the light modulator 11, and a light recycling system 15 disposed between the light modulator 11 and the relay system 14.

Figure 2:
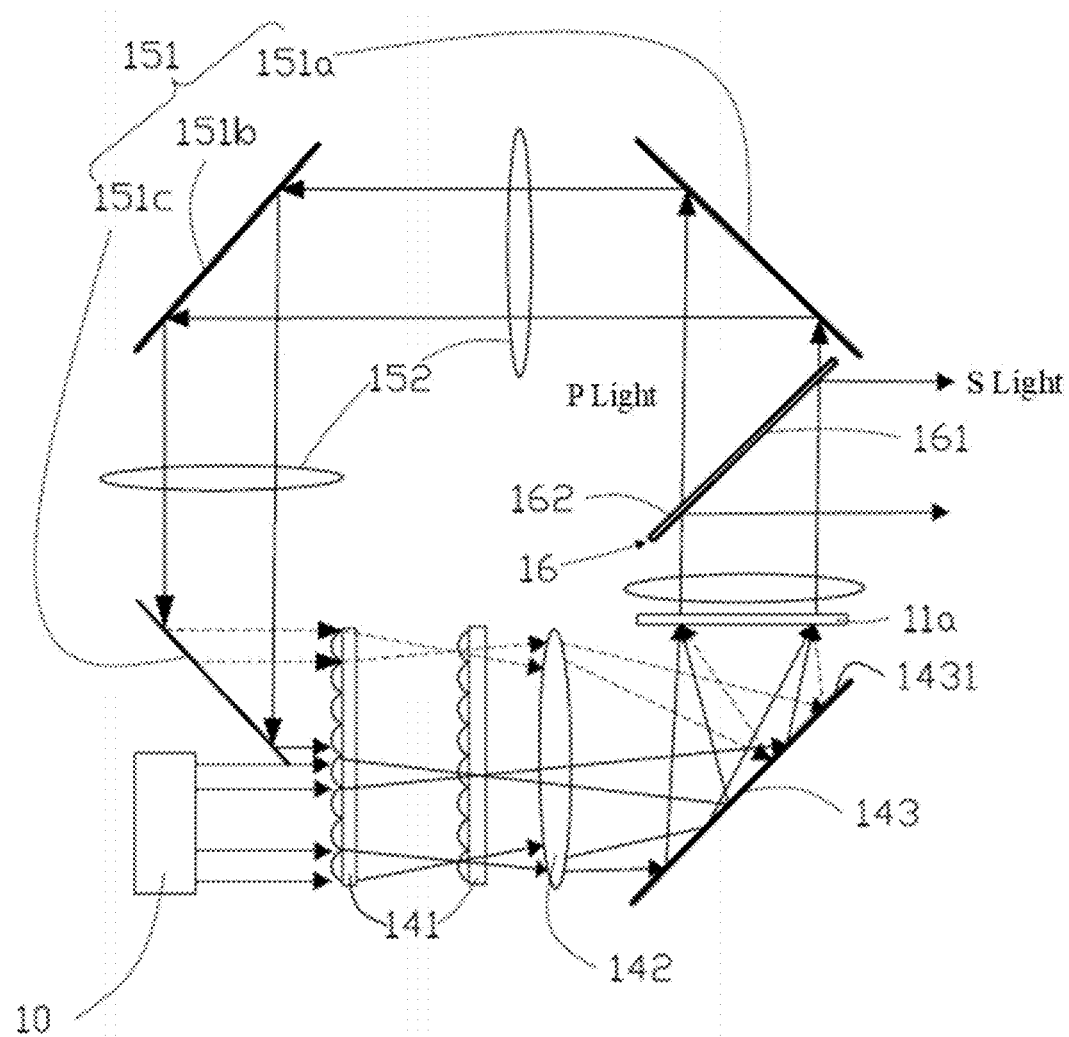
FIG. 2 is a schematic diagram showing an optical path in an illumination part and a front portion of an optical path in an imaging part of the excitation light intensity control system shown in FIG. 1.

Referring to FIG. 2, it is a schematic diagram showing an optical path in an illumination part and a front portion of an optical path in an imaging part of the excitation light intensity control system shown in FIG. 1, i.e., a portion of the optical path before the excitation light is emitted to the color conversion element 12. In the present embodiment, the excitation light intensity control system 1 has two portions, i.e., a forward optical path and a reverse optical path. In the present embodiment, the forward optical path refers to an optical path along which light enters a downstream element from an upstream element of the excitation light intensity control system 1. For example, an optical path from the light source 10 to the light modulator 11 belongs to the forward path. The reverse optical path refers to an optical path along which light returns from the downstream element to the upstream element in the excitation light intensity control system 1. For example, an optical path returning to the relay system 14 via the light recycling system 15 belongs to the reverse optical path.

In the present embodiment, the light source 10 is a laser light source and is a blue laser light source. Therefore, in the present embodiment, blue laser light is used as the excitation light. In the present embodiment, the relay system 14 includes a fly-eye lens array 141, a convex lens 142, and a reflector 143. The fly-eye lens array 141, the convex lens 142 and the reflector 143 are arranged in sequence. The blue laser light emitted by the light source 10 enters the fly-eye lens array 141, and it enters the convex lens 142 after the fly-eye lens array 141 improves its uniformity and brightness. The convex lens 142 shapes the incoming blue laser light, to form a light spot suitable for a size and shape of the light modulator 11. The light spot enters the light modulator 11 after being reflected by the reflector 143. In the present embodiment, the fly-eye lens array 141 is a double-row fly-eye lens array. The fly-eye lens array 141 is disposed substantially in parallel with the convex lens 142, and optical axis directions thereof substantially coincide. The light modulator 11 is disposed substantially perpendicular to the fly-eye lens array 141 and the convex lens 142. The reflector 143 is disposed obliquely with respect to the convex lens 142 and the light modulator 11, for example, the reflector 143 is disposed at an angle of substantially 45 degrees with respect to the convex lens 142 and the light modulator 11, and a reflective surface 1431 of the reflector 143 is simultaneously obliquely facing to the convex lens 142 and the light modulator 11, to reflect the blue laser light emitted by the convex lens 142 to the light modulator 11.

It can be understood that the relay system can also be composed of other optical elements, or can adopt a different arrangement, as long as it can appropriately guide the excitation light emitted by the light source and the light returned from the light recycling system to the light modulator 11.

The light modulator 11 in the present embodiment is an LCD light modulator 11a. Without doubt, the LCD light modulator 11a is only an example, and in other embodiments, the light modulator 11 can also be a DMD light modulator or an LCOS light modulator or the like. For image data of each frame of image, the LCD light modulator 11a modulates, under the control of the controller 13, the blue laser light emitted by the reflector 143 to the LCD light modulator 11a, so that it carries image information, and the modulated two portions of the blue laser light enter a Polarization Beam Splitter 16 (hereinafter referred to as PBS). The PBS 16 divides the modulated two portions of the blue laser light into first polarized light and second polarized light. In the present embodiment, the first polarized light is P-polarized light (hereinafter referred to as P light), and the second polarized light is S-polarized light (hereinafter referred to as S light). The S light enters the color conversion element 12, and the P light enters the light recycling system 15 for light recycling. In the embodiment, the PBS 16 is disposed in a light exit direction of the LCD light modulator 11a and includes a first surface 161 and a second surface 162 that are opposite to each other. The PBS 16 is disposed obliquely with respect to the LCD light modulator 11a, such as at an angle of 45 degrees. The first surface 161 faces the LCD light modulator 11a and the second surface backs to the LCD light modulator 11a. The PBS separates the P light and the S light, the P light exits from the second surface 162 after being transmitted, and the S light exits from the first surface 161 after being reflected.

In the present embodiment, the light recycling system 15 couples the P light to the fly-eye lens array 141, such that it re-enters the forward optical path through the fly-eye lens array 141 and enters the LCD through the forward optical path to be reused. Specifically, in the present embodiment, the light recycling system 15 includes three reflectors 151 and a convex lens 152 provided between every two adjacent reflectors 151. The three reflectors work together to change a direction of an optical path of the P light, so as to couple it to the fly-eye lens array 141. The first reflector 151a is disposed on an exit optical path of the PBS 16 and is substantially perpendicular to the second surface 162 of the PBS 16. The second reflector 151b is disposed on an exit optical path of the first reflector 151a and is substantially perpendicular to the first reflector 151a. The third reflector 151c is disposed on an exit optical path of the second reflector 151b and is substantially perpendicular to the second reflector 151b. The third reflector 151c is further disposed obliquely relative to the fly-eye lens array 141, for example, at an angle of 45 degrees. One convex lens 152 is disposed between the first reflector 151a and the second reflector 151b, and is disposed between the second reflector 151b and the third reflector 151c. The convex lens 152 prevents the P light from being diverged.

Further, if a polarization state of a light beam recycled by the light recycling system 15 is different from a polarization state of the excitation light emitted by the light source 10, a phase retarder can further be provided in the light recycling system 15 to change the polarization state of the light beam, so that the polarization state of the light beam is the same as that of the excitation light emitted by the light source 10. For example, if the excitation light emitted by the light source 10 is S light, then when the light beam recycled by the light recycling system 15 is the P light, a one-half wave-plate can be disposed in the light recycling system 15, to convert the P light into S light and then couple the S light to make the S light be incident to the relay system 14. In the case where the polarization state of the light beam recycled by the light recycling system 15 is the same as that of the excitation light emitted by the light source 10, it is not necessary to provide the above phase retarder.

A solution of the light recycling system 15 is exemplified above, but solutions of the light recycling system 15 are not limited thereto. For example, the number, distance, and arrangement of the reflectors can be changed to form various solutions, and it is also possible to provide more or less optical elements between the reflectors or even replace some or all of the reflectors with other optical components. In addition, an arrangement of the light recycling system 15 is also related to arrangement of the relay system 14 and the LCD light modulator 11a, so changing the arrangement of the relay system 14 and the LCD light modulator 11a can also affect the arrangement solution of the light recycling system 15. However, in any event, any solution that can couple a portion of the light emitted by the LCD light modulator 11a to re-enter the LCD light modulator 11a does not depart from the scope of the present disclosure.

Figure 3:
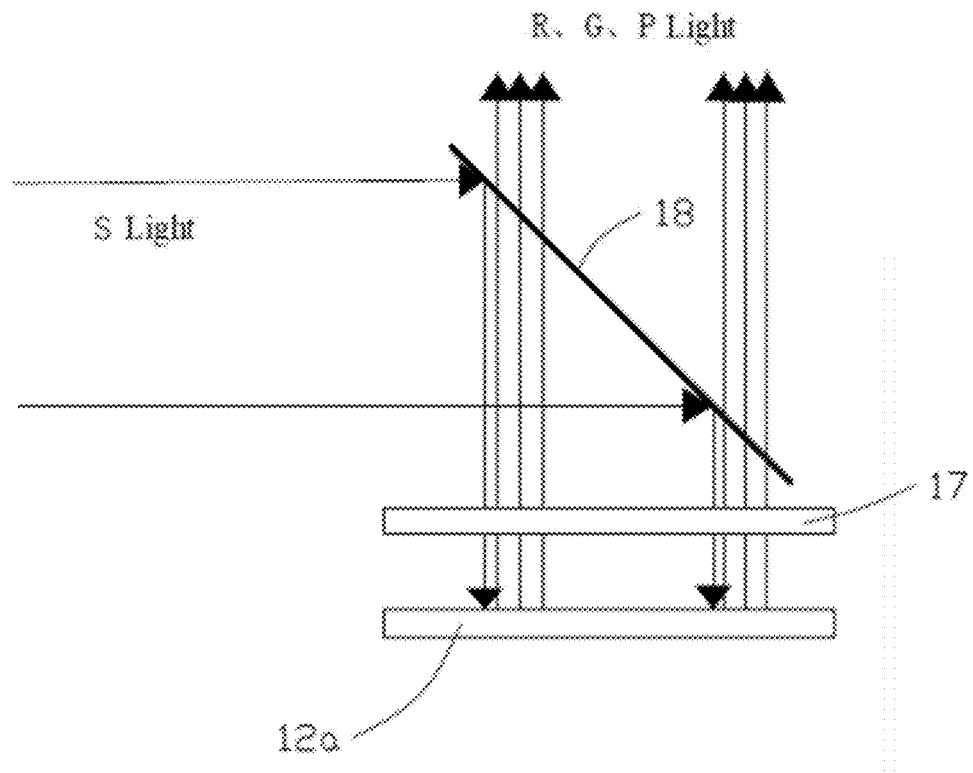
FIG. 3 is a schematic diagram showing a rear portion of an optical path in the imaging part of the excitation light intensity control system shown in FIG. 1.

Referring to FIG. 3, it is a schematic diagram of a rear portion of the optical path in the imaging part of the excitation light intensity control system 1 shown in FIG. 1. In the present embodiment, the schematic diagram of the rear portion of the optical path in the imaging part illustrates the color conversion element 12, a quarter wave-plate 17, and a dichroic sheet 18. In the present embodiment, the color conversion element 12 is a fluorescence chip 12a and is a reflective fluorescence chip. The quarter wave-plate 17 is disposed substantially in parallel with the fluorescence chip 12a. The dichroic sheet 18 faces both an incidence direction of the S-light and the quarter wave-plate 17, and is disposed obliquely relative to both an incidence direction of a blue S light and the quarter wave-plate 17, for example, it is disposed at an angle of 45 degrees relative to the incidence direction of the S light and the quarter wave-plate 17.

In the present embodiment, it is to be noted that multiple pixel points can be formed by coating a fluorescent material and/or a scattering material on a substrate, so as to form the fluorescence chip 12a. Each pixel point is composed of three kinds of sub-pixel points of red, green and blue, and each kind of the sub-pixel point is coated with the corresponding fluorescent material and/or scattering material. Therefore, under an excitation of the excitation light, each sub-pixel point of the fluorescence chip 12a generates red, green, or blue excited light or scatters excitation light, so as to enable the fluorescence chip 12a to emit color image light. In other embodiments, the kind, number, and color of the sub-pixel point of the fluorescence chip can be changed as needed. For example, each pixel point includes only two kinds of sub-pixel points or more kinds of sub-pixel points, the number of each kind of the sub-pixel is one or more, and each pixel point includes sub-pixel points of other colors that are different from the three colors of red, green and blue.

Figure 4:
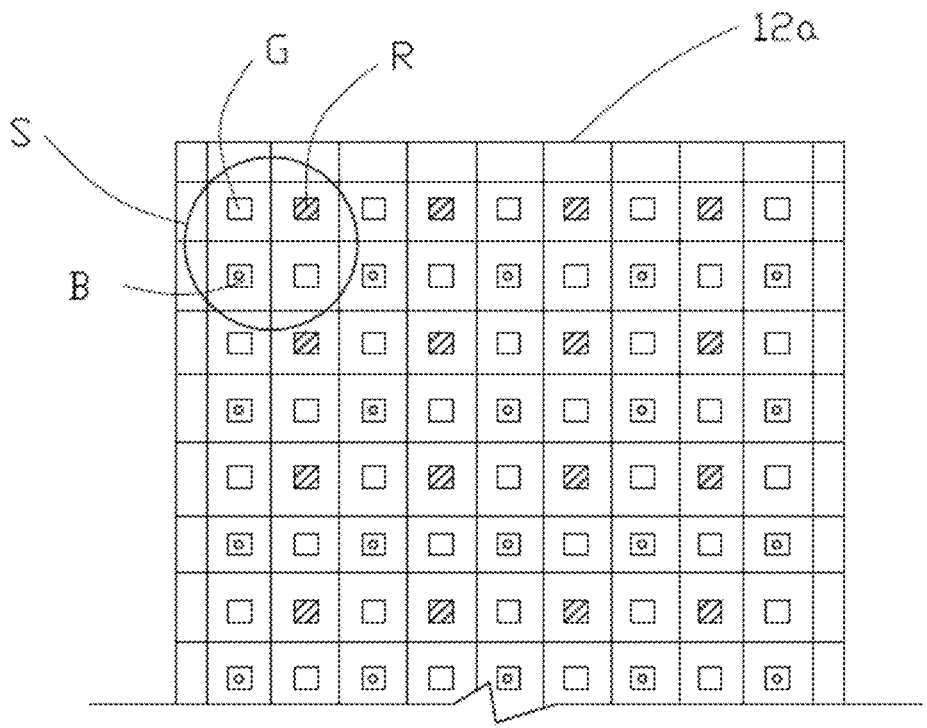
FIG. 4 is a schematic diagram showing distribution of pixels of a fluorescence chip of the excitation light intensity control system shown in FIG. 1.

Referring to FIG. 4, it is a schematic diagram of a distribution of the pixel points on the fluorescence chip 12a in the present embodiment. The fluorescence chip 12a, under the excitation of the excitation light, generates R, G, and B excited light or R and G excited light and scatters the excitation light, to form a color image. The fluorescence chip 12 includes multiple pixel points S, and the pixel points S are arranged in a matrix. Each pixel point S includes at least two kinds of sub-pixel points, and each kind of the sub-pixel point is formed by coating a corresponding fluorescent material or coating a corresponding scattering material. In the present embodiment, each pixel point S includes at least one red sub-pixel point R, at least one green sub-pixel point G, and at least one blue sub-pixel point B. In the present embodiment, each pixel point S includes one red sub-pixel point R, two green sub-pixel points G, and one blue sub-pixel point B. The red sub-pixel point R is coated with a red fluorescent material, the green sub-pixel point G is coated with a green fluorescent material, and the blue sub-pixel point B is coated with a blue fluorescent material or a scattering powder. Under the action of the excitation light, the red sub-pixel point R generates red light, and the green sub-pixel point G generates green light, while the blue sub-pixel point B generates blue light or scatters an incident blue laser light. According to a light intensity of each sub-pixel point, each pixel point presents a desired color, such that the image projected through the projection lens 20 to a screen by the fluorescence chip 12a is a frame of color image.

It can be understood that the pixel points S can be arranged according to other rules. For example, the pixel points are not necessarily arranged in a matrix but can also be arranged into other desired shapes, such as a circular shape. Each pixel point S only needs to include two kinds of sub-pixel points at the same time or includes three kinds of sub-pixel points of red, green and blue at the same time, and the number of each kind of sub-pixel point and proportion of different kinds of sub-pixel point can be selected according to actual needs.

Referring to FIG. 3 again, the dichroic sheet 18 reflects the S light, transmits the P light, and R (red) and G (green) light. After the S light emitted by the PBS 16 reaches the dichroic sheet 18, it is reflected by the dichroic sheet 18 to the quarter wave-plate 17. The S light is turned into circularly polarized light after passing through the quarter wave-plate 17. After the circularly polarized light reaches the fluorescence chip 12a, it excites the corresponding red and green sub-pixel points R and G to respectively generate red light and green light. The red light and green light are transmitted through the dichroic sheet 18 after passing through the quarter wave-plate 17. Moreover, in the present embodiment, the blue sub-pixel point B on the fluorescence chip 12a is coated with polarization-maintaining scattering powder, that is, to maintain a polarization direction unchanged. Therefore, after the circularly polarized light reaches the corresponding blue sub-pixel point B on the fluorescence chip 12a, it is scattered with the polarization being maintained, and it is again turned into P-light after passing through the quarter wave-plate 17. The P-light is transmitted by the dichroic sheet 18.

It can be understood that depending on the arrangement of the optical path direction, the dichroic sheet 18 can also transmit the excitation light and reflect the excited light, that is, to transmit the light emitted by the PBS 16 and reflect the light emitted by the fluorescence chip 12a.

It can be understood that the number of the fluorescence chip 12a is not limited to one, and it can be two or more, which are arranged according to a certain rule. For example, two fluorescence chips 12 can be arranged side by side.

It can be understood that in the rear portion of the optical path of the imaging part in the above embodiment, although the S light is incident and finally the P light and red and green lights are emitted, it is possible for the P light to be incident and for the S light and red and green lights to be emitted finally. In addition, when light of other primary color is used as the excitation light, there may also be different choices based on their polarization states.

It can be understood that a transmissive fluorescence chip can also be used, the excitation light is incident from one side of the transmissive fluorescence chip, and the excited light is emitted by another side of the transmissive fluorescence chip. In this case, the dichroic sheet and the waveplate can be not used.

It can be understood that besides the red, green, and blue laser light, other suitable light sources, such as an ultraviolet (UV) light source, can also be used.

Figure 5:
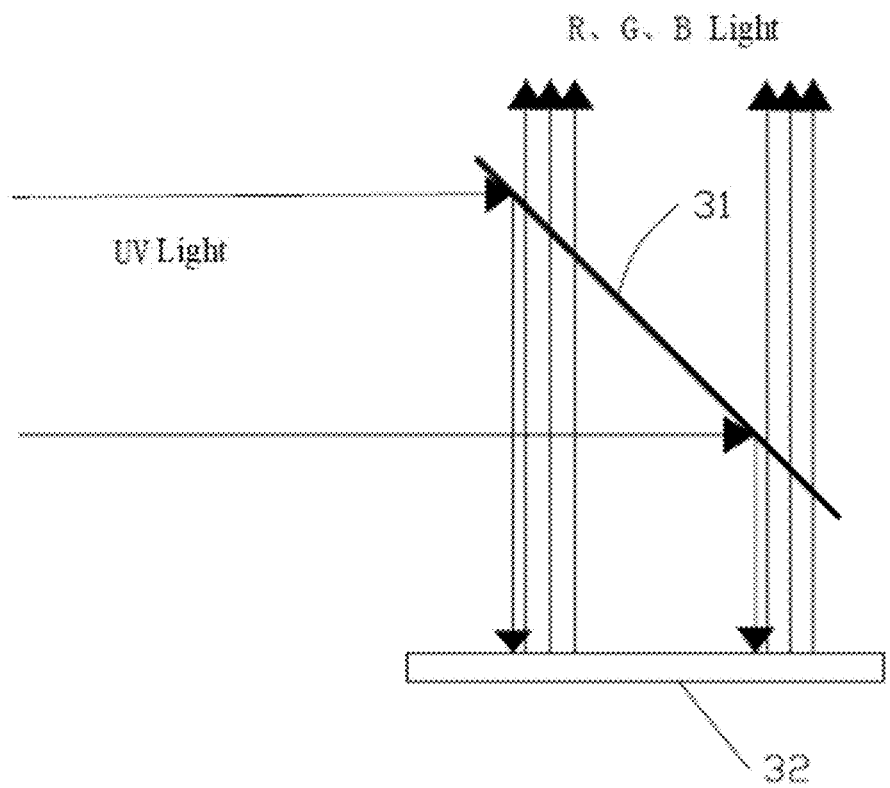
FIG. 5 is a schematic diagram showing a rear portion of an optical path in an imaging part of the excitation light intensity control system according to a second embodiment of the present disclosure.

Referring to FIG. 5, it is a schematic diagram of a rear portion of an optical path of an imaging part in a second embodiment of the present disclosure when a UV light source is used. The schematic diagram of the rear portion of the optical path in the imaging part illustrates the dichroic sheet 31 and the fluorescence chip 32. The dichroic sheet 31 faces both an incidence direction of the UV light and the fluorescence chip 32, and it is inclined relative to the incidence direction of the UV light and the fluorescence chip 32. The dichroic sheet 31 reflects the UV light and transmits the red, green, and blue light. After the UV light emitted by the UV light source is modulated by the light modulator to carry image information, it is reflected by the dichroic sheet 31 into the fluorescence chip 32. The red, green and blue sub-pixel points R, G, and B on the fluorescence chip 32 are respectively coated with a red fluorescent material, a green fluorescent material, and a blue fluorescent material. Under the excitation of the UV excitation light, the corresponding red, green and blue sub-pixel points R, G, and B on the fluorescence chip 32 respectively generate red, green, and blue excited light. The red, green, and blue excited light is transmitted by the dichroic sheet 31 and emitted to the screen through a projection lens to form a frame of color image.

In the embodiment of the present disclosure, the controller 13 can control the intensity of the excitation light emitted by the light source 10 and the intensity of the excitation light emitted by the light modulator 11. Still taking the LCD light modulator 11a as an example, for each R, G, B image signal value (i.e., sub-pixel value) corresponding to each frame of image data, the controller 13 can control the signal value of the LCD light modulator 11a, to control the intensity of the excitation light emitted by the LCD light modulator 11a. For each image signal value corresponding to each frame of image, the LCD signal value is in direct proportional to a voltage value (or a current value, etc.) applied to a corresponding light valve of the LCD light modulator 11a. How the controller 13 controls the light source 10 and the LCD light modulator 11a will be specifically described below.

Figure 6:
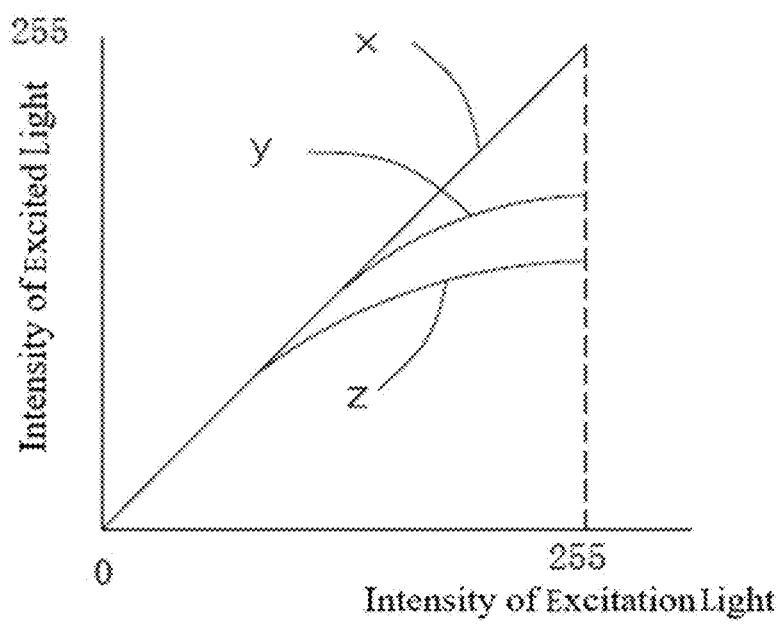
FIG. 6 is a graph showing response curves of red, green and blue fluorescent materials/scattering materials to excitation light when the excitation light is blue laser light.
Figure 7:
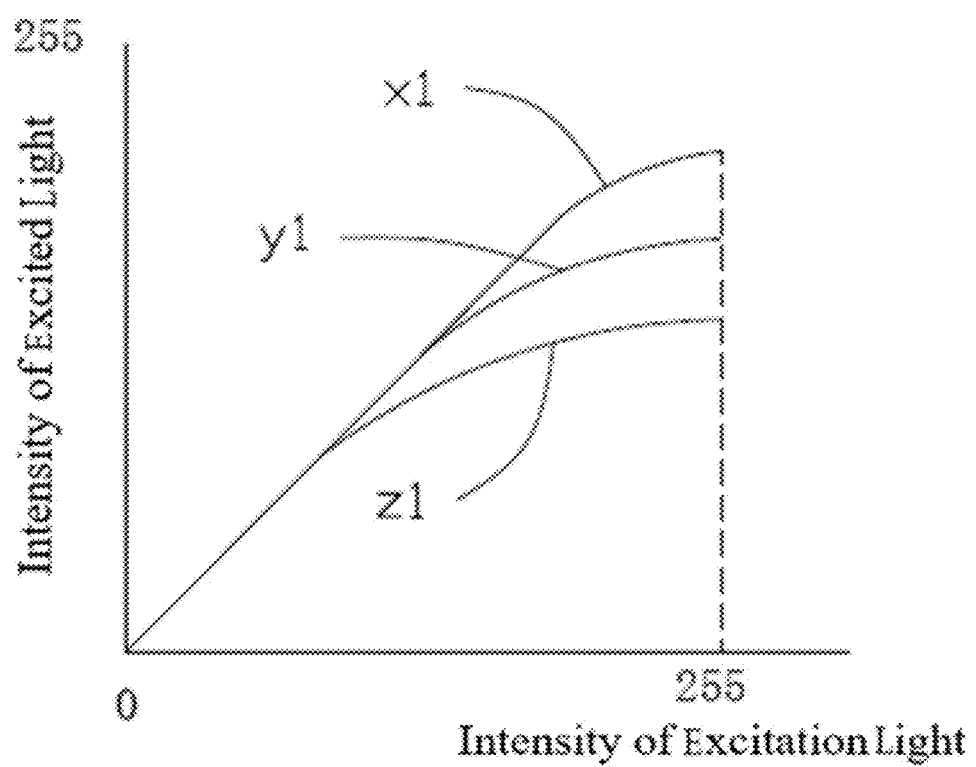
FIG. 7 is a graph showing response curves of red, green and blue fluorescent materials to excitation light when the excitation light is UV light.

The LCD signal value is determined by the controller 13 according to the image signal value and response curves of particular fluorescent materials (e.g., the yellow, green, red, blue fluorescent materials) or scattering materials coated on the fluorescence chip 12a. For different fluorescent materials and scattering materials, their response curves to different excitation light are affected by factors such as thermal saturation and light saturation. Referring to FIG. 6 and FIG. 7, diagrams of the response curves of the red, green, and blue fluorescent materials or scattering materials to the excitation light of the blue laser light and the UV light are respectively illustrated. Lines x and x1 represent the response curves of the blue scattering material and the blue fluorescent material, respectively, y and y1 represent the response curves of the green fluorescent material, and z and z1 represent the response curves of the red fluorescent material. It can be seen that under the same intensity of excitation light, the intensity of excited light generated by the corresponding red, green, blue fluorescent materials or scattering materials is different, which results in brightness values of the emitted image being also different. In addition, under the excitation of different excitation light, the response curves of the fluorescent materials and of the scattering materials are also different. As shown in FIG. 6, the response curve, in the case where the blue laser light is used to excite the polarization-maintaining scattering powder, is substantially linearly increased, while in FIG. 7, the UV light is used to excite the blue fluorescent material, and the blue fluorescent material generates heat. Therefore, the response curve of the blue fluorescent material is in a trend of saturating and nonlinearly increases.

In one embodiment, data of response curve of the corresponding fluorescent material/scattering material can be stored in the controller 13 or other devices available to the controller 13, and formulas related to the LCD signal values, the image signal values and response curve parameters of the fluorescent materials/scattering materials are also stored in the controller 13 or other devices available to the controller 13, so that for different R, G, B image signal values, the LCD signal values of the corresponding red, green, and blue sub-pixel points can be calculated by the controller 13, to control the intensity of the excitation light emitted by the LCD light modulator 11a. For example, for a specific R image signal value, a LCD signal value of a corresponding red sub-pixel point can be calculated by the controller 13 according to a response curve parameter of the red fluorescent material and the specific R image signal value; for a specific G image signal value, a LCD signal value of a corresponding green sub-pixel point can be calculated by the controller 13 according to a response curve parameter of the green fluorescent material and the specific G image signal value; by analogy, a required LCD signal value can be obtained.

In an embodiment of the present disclosure, the controller 13 controls the intensity of the excitation light emitted by the light source 10 according to a following formula: $I=I_{MAX}*(a'+b'+c')/(A+B+C)$, where I represents the intensity of the excitation light emitted by the light source after the light source 10 is controlled by the controller 13; $I_{MAX}$ represents maximum intensity of the excitation light that the light source can emit; a' and A respectively represent the LCD signal value of a red sub-pixel point corresponding to the maximum pixel value among all the red sub-pixel points in one frame of image, and an LCD maximum signal value of the red sub-pixel points; b' and B respectively represent the LCD signal value of a green sub-pixel point corresponding to the maximum pixel value among all the green sub-pixel points in one frame of image, and an LCD maximum signal value of the green sub-pixel points; c' and C respectively represent the LCD signal value of a blue sub-pixel point corresponding to the maximum pixel value among all the blue sub-pixel points in one frame of image, and an LCD maximum signal value of the blue sub-pixel point. When displaying one frame of image, since the intensity of the excitation light emitted by the light source has been obtained after being adjusted according to the above formula, the signal value required by the respective sub-pixel point is further used to controls, according to the image signal value, a threshold of a light valve of the LCD light modulator 11a corresponding to this sub-pixel point, such that the intensity of the excitation light of the respective sub-pixel point is consistent with the light intensity required to be displayed. For example, when one red sub-pixel point in this frame of image displays with a maximum value of the red sub-pixel point in this frame of image, the signal value corresponding to this red sub-pixel point is a', and the LCD light modulator 11a adjusts a threshold of a light valve corresponding to this red sub-pixel point to the maximum, so that the LCD light modulator 11a can transmit all of the excitation light corresponding to a position of this red sub-pixel point; when some red sub-pixel points in the frame of image display with non-maximum value of the red sub-pixel points in the frame of image, the signal values corresponding to these red sub-pixel points are smaller than a', and thresholds of light valves of the LCD light modulator 11a corresponding to these red sub-pixel points are controlled according to corresponding image signal values base on a ratio, so that the LCD light modulator 11a transmits, according to the corresponding ratio, the excitation light corresponding to positions of these red sub-pixel points, instead of transmitting all the excitation light.

Taking a case where R, G, and B values of white light pixel points are all 255 as an example, if the LCD signal values corresponding to the R, G, and B sub-pixels, which are calculated by the controller 13, are 400, 768, and 500, respectively, and the LCD maximum signal values corresponding to the red, green and blue sub-pixel points are all 768, then the intensity of the excitation light emitted by the light source can be adjusted to (400+768+500)/(768*3) =73% of its maximum value $I_{MAX}$. Taking a case where the R, G, and B values of the white light pixel points are all 20 as an example, for the same excitation light intensity control system, if the LCD signal value corresponding to the red, green, and blue sub-pixel points, which is calculated by the controller 13, are 30, 50, and 30, respectively, then the intensity of the excitation light emitted by the light source can be adjusted to (30+50+30)/(768*3)=5% of its maximum value $I_{MAX}$.

It should be noted that for the red, green and blue sub-pixel points of any frame of image, the control methods of the light source 10 and the LCD light modulator 11a described in the above embodiments are applicable to two schemes of time-sequence light emission and non-time-sequence light emission.

Figure 8:
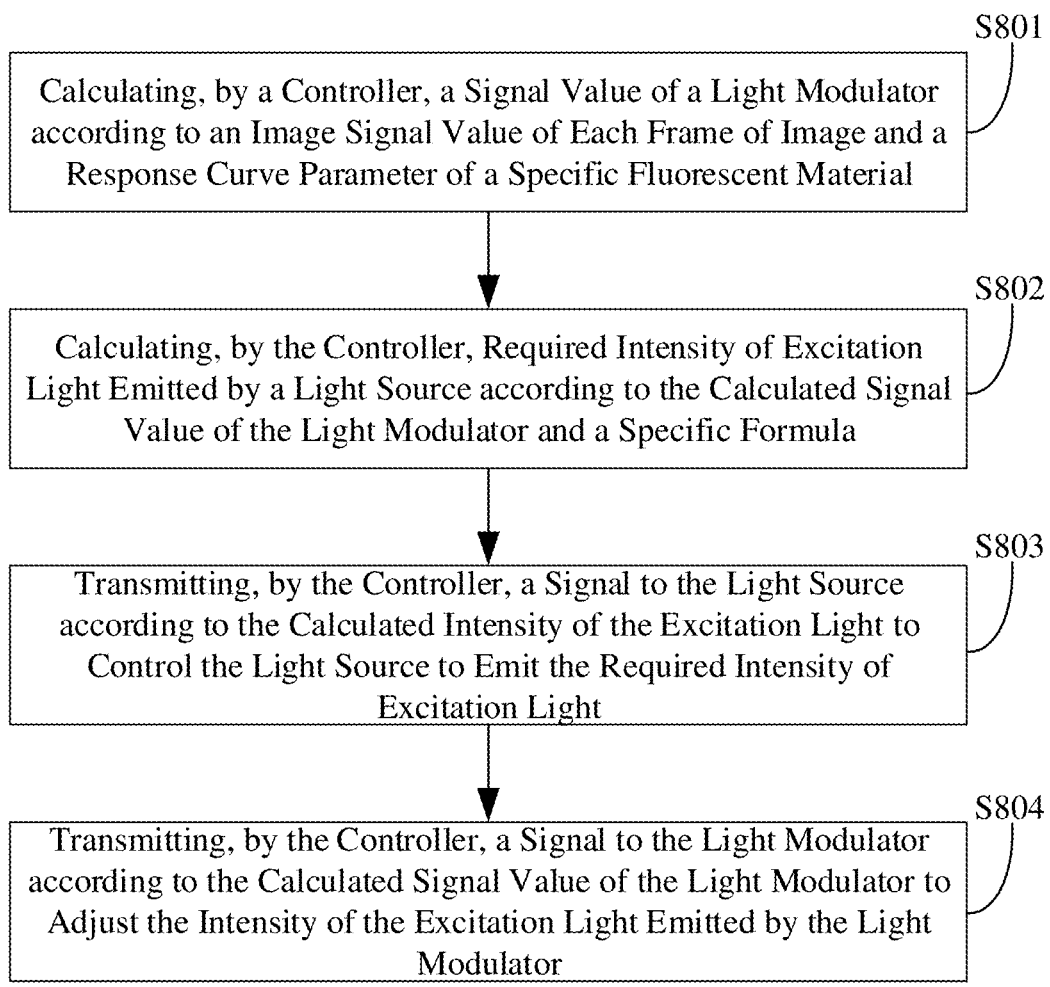
FIG. 8 is a flowchart showing an excitation light intensity control method according to an embodiment of the present disclosure.

Referring to FIG. 8, a flowchart of a method for controlling the intensity of excitation light according to an embodiment of the present disclosure is illustrated. The method can be performed in combination with the excitation light intensity control system 1 described above, and it includes following steps.

At step S801, the controller 13 calculates the signal value of the light modulator 11 according to the image signal value (i.e., the sub-pixel value) of each frame of image and the response curve parameter of the specific fluorescent material.

At step S802, the controller 13 calculates required intensity of the excitation light emitted by the light source 10 according to a ratio of the signal value of the calculated light modulator 11 to the maximum signal value of the light modulator 11.

At step S803, the controller 13 transmits a signal to the light source 10 according to the calculated intensity of the excitation light, to control the light source to emit the required intensity of the excitation light.

At step S804, the controller 13 transmits a signal to the light modulator 11 according to the calculated signal value of the light modulator 11, to adjust the intensity of the excitation light emitted by the light modulator 11.

In the above step S802, the intensity of the excitation light required to be emitted by the light source 10 is calculated according to the following formula: $I=I_{MAX}*(a'+b'+c')/(A+B+C)$, where I represents the intensity of the excitation light emitted by the light source after the light source 10 is controlled by the controller 13; $I_{MAX}$ represents maximum intensity of the excitation light that the light source can emit; a' and A respectively represent the LCD signal value of a red sub-pixel point corresponding to the maximum pixel value among all the red sub-pixel points in one frame of image, and an LCD maximum signal value of the red sub-pixel point; b' and B respectively represent the LCD signal value of a green sub-pixel point corresponding to the maximum pixel value among all the green sub-pixel points in one frame of image, and an LCD maximum signal value of the green sub-pixel point; c' and C respectively represent the LCD signal value of a blue sub-pixel point corresponding to the maximum pixel value among all the blue sub-pixel points in one frame of image, and an LCD maximum signal value of the blue sub-pixel point.

In an embodiment, the method can further include: controlling, at the light source 10, the light source 10 to emit the required intensity of the excitation light; and controlling, at the light modulator 11, the intensity of the excitation light emitted by the light modulator 11.

In an embodiment, the method can further include: separating two portions of the excitation light exiting from the light modulator into two paths; recoupling one of the two paths to the light modulator through a light recycling system; and guiding the other of the two paths to the color conversion element so as to excite the color conversion element to generate multicolor excited light. To conclude, the excitation light intensity control system and the projection system provided by the embodiments of the present disclosure, due to being provided with the light recycling system, recycle and reuse the excitation light, such that the recycling and utilization efficiency of the excitation light is improved. In another aspect, based on the recycling and reuse of the excitation light, the embodiment of the present disclosure also controls the intensity of the excitation light emitted by the light modulator and/or the light source in a specific manner, such that it is ensured that the image that is projected to the screen will not be distorted, and due to reduction of the intensity of the light source, energy consumption is reduced, which improves the utilization efficiency of the light energy.

The above embodiments are merely illustrative of the technical solutions of the present disclosure and are not intended to limit the technical solutions. Although the present disclosure has been described in detail with reference to the preferred embodiments, it should be understood by those skilled in the art that modifications and equivalent alternations to the present disclosure can be made without departing from the spirit and scope of the present disclosure.

What is claimed is:

1. An excitation light intensity control system, comprising:
    an illumination part comprising a light source;
    an imaging part comprising a light modulator, wherein excitation light emitted by the light source is guided into the light modulator for modulation; and
    a control part,
    wherein the imaging part further comprises a color conversion element, and the excitation light modulated by the light modulator excites the color conversion element to generate multicolor excited light;
    wherein the illumination part further comprises a light recycling system configured to recouple one of two portions of excitation light emitted by the light modulator to the light modulator, and the other of the two portions of excitation light is guided to enter the color conversion element;
    wherein the control part is configured to receive original image data and control intensity of the excitation light emitted by the light modulator and/or intensity of the excitation light emitted by the light source; and
    wherein a light path that the excitation light emitted by the light source is guided into the light modulator for modulation is different from a light path of the one of two portions of excitation light that is recoupled to the light recycling system.

2. The excitation light intensity control system according to claim 1, wherein a plurality of pixel points is arranged on the color conversion element, wherein each of the plurality of pixel points comprises at least two kinds of sub-pixel points, and each of the at least two kinds of sub-pixel points is formed by coating a corresponding fluorescent material or scattering material.

3. The excitation light intensity control system according to claim 2, wherein the control part controls the intensity of the excitation light emitted by the light modulator based on the original image data and a response curve parameter of the corresponding fluorescent material and/or scattering material coated on the color conversion element.

4. The excitation light intensity control system according to claim 3, wherein the control part calculates a signal value of the light modulator based on an image signal value of the original image data and the response curve parameter of the corresponding fluorescent material and/or scattering material coated on the color conversion element and further controls the intensity of the excitation light emitted by the light source based on the signal value.

5. The excitation light intensity control system according to claim 4, wherein the control part controls the intensity of the excitation light emitted by the light source based on a formula: $I=I_{MAX}*(a'+b'+c')/(A+B+C)$, where I represents required intensity of the excitation light emitted by the light source, $I_{MAX}$ represents maximum intensity of the excitation light that the light source is able to emit, a' and A respectively represent an LCD signal value of a red sub-pixel point corresponding to a maximum pixel value among all red sub-pixel points in one frame of image and an LCD maximum signal value of the red sub-pixel points, b' and B respectively represent an LCD signal value of a green sub-pixel point corresponding to a maximum pixel value among all green sub-pixel points in the one frame of image and an LCD maximum signal value of the green sub-pixel points, and c' and C respectively represent an LCD signal value of a blue sub-pixel point corresponding to a maximum pixel value among all blue sub-pixel points in the one frame of image and an LCD maximum signal value of the blue sub-pixel points.

6. The excitation light intensity control system according to claim 5, wherein the light modulator is an LCD light modulator.

7. The excitation light intensity control system according to claim 2, wherein the illumination part further comprises a relay system disposed between the light source and the light modulator.

8. The excitation light intensity control system according to claim 7, wherein the light recycling system is configured to couple the one of the two portions of excitation light emitted by the light modulator to the relay system through which the one of the two portions of excitation light is incident to the light modulator again.

9. The excitation light intensity control system according to claim 8, wherein the imaging part further comprises a polarization beam splitter configured to separate the two portions of the excitation light emitted by the light modulator into first polarized light and second polarized light, wherein the first polarized light enters the light recycling system, and the second polarized light exits from the imaging part after being converted into first polarized light.

10. The excitation light intensity control system according to claim 9, wherein the light source emits blue laser light, and the imaging part emits the first polarized light obtained by converting the second polarized light and emits light of at least one of other colors.

11. The excitation light intensity control system according to claim 9, wherein the imaging part further comprises a dichroic sheet disposed between the polarization beam splitter and the color conversion element, wherein the dichroic sheet is configured to transmit the second polarized light incident from the polarization beam splitter to the color conversion element and to reflect the excited light emitted by the color conversion element, or the dichroic sheet is configured to reflect the second polarized light incident from the polarization beam splitter to the color conversion element and to transmit the excited light emitted by the color conversion element.

12. The excitation light intensity control system according to claim 11, wherein the light source emits blue laser light, the second polarized light is obtained after the blue laser light passes through the polarization beam splitter and is converted into the first polarized light by the imaging part, and the imaging part emits the first polarized light and light of at least one of other colors.

13. The excitation light intensity control system according to claim 12, wherein the imaging part further comprises a quarter wave-plate disposed between the dichroic sheet and the color conversion element.

14. The excitation light intensity control system according to claim 12 wherein each of the plurality of pixel points arranged on the color conversion element comprises a blue sub-pixel point formed by coating polarization-maintaining scattering powder.

15. The excitation light intensity control system according to claim 1, wherein the light source emits UV light.

16. An excitation light intensity control method, applicable to an excitation light intensity control system comprising a light source, a light modulator, a color conversion element and a controller,
wherein the method comprises:
calculating, by the controller, a signal value of the light modulator based on an image signal value of one frame of image and a response curve parameter of a specific fluorescent material coated on the color conversion element;
calculating, by the controller, required intensity of excitation light emitted by the light source based on a ratio of the calculated signal value of the light modulator and a maximum signal value of the light modulator;
transmitting, by the controller, a signal to the light source to control the light source to emit the required intensity of the excitation light;
transmitting, by the controller, a signal to the light modulator to control intensity of the excitation light emitted by the light modulator;
separating two portions of the excitation light exiting from the light modulator into two paths;
recoupling one of the two paths to the light modulator through a light recycling system; and
guiding the other of the two paths to the color conversion element and exciting the color conversion element to generate multicolor excited light, wherein a light path that the excitation light emitted by the light source is guided into the light modulator for modulation is different from the one of the two paths that is recoupled to the light modulator through the light recycling system.

17. The excitation light intensity control method according to claim 16, wherein the method further comprises:
controlling, at the light source, the light source to emit the required intensity of the excitation light; and
controlling, at the light modulator, the intensity of the excitation light emitted by the light modulator.

18. The excitation light intensity control method according to claim 16, wherein the required intensity of the excitation light emitted by the light source is calculated by the controller based on a formula: $I=I_{MAX}*(a'+b'+c')/(A+B+C)$,
where I represents required intensity of the excitation light emitted by the light source, $I_{MAX}$ represents maximum intensity of the excitation light that the light source is able to emit, a' and A respectively represent an LCD signal value of a red sub-pixel point corresponding to a maximum pixel value among all red sub-pixel points in one frame of image and an LCD maximum signal value of the red sub-pixel points, b' and B respectively represent an LCD signal value of a green sub-pixel point corresponding to a maximum pixel value among all green sub-pixel points in the one frame of image and an LCD maximum signal value of the green sub-pixel points, and c' and C respectively represent an LCD signal value of a blue sub-pixel point corresponding to a maximum pixel value among all blue sub-pixel points in the one frame of image and an LCD maximum signal value of the blue sub-pixel points.

19. A projection system, wherein the projection system comprises an excitation light intensity control system and a projection lens, wherein the excitation light intensity control system comprises:
an illumination part comprising a light source;
an imaging part comprising a light modulator, wherein excitation light emitted by the light source is guided into the light modulator for modulation; and
a control part,
wherein the imaging part further comprises a color conversion element, and the excitation light modulated by the light modulator excites the color conversion element to generate multicolor excited light;
wherein the illumination part further comprises a light recycling system configured to recouple one of two portions of excitation light emitted by the light modulator to the light modulator, and the other of the two portions of excitation light is guided to enter the color conversion element;
wherein the control part is configured to receive original image data and control intensity of the excitation light emitted by the light modulator and/or intensity of the excitation light emitted by the light source;
wherein excited light emitted by the excitation light intensity control system is projected onto a screen through the projection lens to render a color image; and
wherein a light path that the excitation light emitted by the light source is guided into the light modulator for modulation is different from a light path of the one of two portions of excitation light that is recoupled to the light recycling system.

* * * * *